(12) United States Patent
Brachet

(10) Patent No.: US 12,496,691 B2
(45) Date of Patent: Dec. 16, 2025

(54) TEMPORARY FASTENER INSTALLATION TOOLING AND ASSOCIATED INSTALLATION SET

(71) Applicant: LISI AEROSPACE, Paris (FR)

(72) Inventor: Julien Brachet, Mehun sur Yèvre (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 18/779,792

(22) Filed: Jul. 22, 2024

(65) Prior Publication Data

US 2025/0033176 A1 Jan. 30, 2025

(30) Foreign Application Priority Data

Jul. 28, 2023 (FR) ....................... 2308209

(51) Int. Cl.
*B25B 31/00* (2006.01)
*F16B 19/10* (2006.01)

(52) U.S. Cl.
CPC .......... *B25B 31/005* (2013.01); *F16B 19/109* (2013.01)

(58) Field of Classification Search
CPC ........ B25B 31/005; F16B 19/109; B21J 15/32
See application file for complete search history.

(56) References Cited

U.S. PATENT DOCUMENTS

| | | | |
|---|---|---|---|
| 3,331,268 A | 7/1967 | Jones et al. | |
| 4,787,274 A * | 11/1988 | Belanger | B25B 31/005 81/59.1 |
| 2011/0088242 A1 | 4/2011 | Luneau | |
| 2016/0129567 A1 * | 5/2016 | Bigot | B25B 31/005 81/55 |
| 2019/0338799 A1 * | 11/2019 | Niklewicz | F16B 13/0833 |
| 2024/0424625 A1 * | 12/2024 | Drewett | B23P 19/04 |

FOREIGN PATENT DOCUMENTS

| | | | | |
|---|---|---|---|---|
| EP | 0466609 A1 * | 1/1992 | .......... | B25B 31/005 |
| EP | 2999571 | 11/2014 | | |
| EP | 3781825 | 10/2019 | | |
| FR | 3080155 | 10/2019 | | |
| GB | 2126146 A * | 3/1984 | .......... | B25B 31/005 |

OTHER PUBLICATIONS

EP-0466609-A1 translation (Year: 1992).*
Bonnin, David, Preliminary Search Report, Dec. 12, 2023, 2 pages, National Institute of Industrial Property, Courbevoie, France.

* cited by examiner

*Primary Examiner* — Michael W Hotchkiss
(74) *Attorney, Agent, or Firm* — Henricks Slavin LLP

(57) ABSTRACT

An installation tool (14) has a tool body (50) comprising a first opening capable of blocking the axial end of the body (26) of a fastener (12) and an actuating device (52), rotatable relative to the tool body and comprising a second opening capable of blocking a fastener actuating element (28). The tool includes a pressure chamber (120) in the tool body a duct (122) connecting the pressure chamber to the first opening (62), a blocking element (124), movable in the duct between a retracted position and a projecting position; and a fluid inlet (55) opening onto the pressure chamber. An inflow of fluid into the pressure chamber moves the blocking element (124) to the protruding position.

10 Claims, 4 Drawing Sheets

TEMPORARY FASTENER INSTALLATION TOOLING AND ASSOCIATED INSTALLATION SET

The present invention relates to an installation tooling for fitting a fastener with at least two pre-drilled structures, said fastener comprising: a fastener body extending along a first axis; and an actuating element projecting from an axial end of the fastener body, the actuating element being capable of rotating relative to the fastener body.

The installation tooling comprises: a tool body of tubular shape, extending along a second axis; an axial end of the tool body comprising a first opening capable of receiving and blocking the rotation of the axial end of the fastener body; an actuating device, received inside the tool body and capable of rotating relative to said tool body, the actuating device defining an internal cavity, an axial end of the actuating device comprising a second opening communicating with an internal cavity, the second opening capable of receiving and rotationally blocking the actuating element of the fastener.

A fastener of this type and a specifically adapted installation tooling are described in detail in document EP3781825, in the name of the Applicant.

The insertion of the fastener into the above-mentioned installation tooling requires the application of significant force, in the order of 5 kg. This force must be maintained in the form of pressure during fastener installation or disassembly. However, current pressure-maintaining systems tend to lose their effectiveness over time.

The purpose of the present invention is to provide an installation tooling equipped with an improved fastener-holding mechanism. For this purpose, the invention relates to an installation tooling of the aforementioned type, further comprising: a pressure chamber, annular in shape, formed in the tool body around the first opening; at least one duct, positioned radially relative to the second axis and connecting the pressure chamber to the first opening; at least one blocking element, movable in the at least one duct between a retracted position and a position projecting into the first opening; and a first fluid inlet, opening onto the pressure chamber.

The installation tooling is configured so that a fluid inlet to the pressure chamber is capable of moving the at least one blocking element towards the protruding position.

In addition to other beneficial aspects of the invention, the installation tooling comprises one or more of the following features, taken individually or according to any technically possible combination:

The installation tooling comprises: a plurality of ducts angularly distributed around the second axis; and a plurality of blocking elements, each of said blocking elements being movable in one of said ducts between the retracted position and the projecting position, the blocking elements preferably being balls;

The installation tooling further comprises: an ejection piston, axially movable in the internal cavity, so as to define an ejection chamber inside said internal cavity; and a second fluid inlet, opening onto the ejection chamber; the installation tooling being configured so that a fluid overpressure in the ejection chamber is able to move the ejection piston towards the second opening;

The installation tooling further comprises an ejector rod extending along the second axis in the internal cavity of the actuating device, a first end of the ejector rod being attached to the ejector piston, a second end of the ejector rod being oriented towards the first opening of the tool body;

The installation tool also comprises a compression spring positioned in the internal cavity around the ejector rod, between an inner crown of the actuating device, positioned close to the second opening, and the piston;

the actuating device comprises: a wrench, capable of being driven in rotation by a motor; and a wrench body, comprising the housing and the second opening; an axial clearance being formed between the wrench and the wrench body;

at least one of the first and second tool openings is equipped with a roller cage or anti-rotation shape, capable of rotationally blocking an external surface of the fastener body and/or fastener actuating element.

The invention further relates to an installation set comprising: a fastener for the temporary assembly of at least two previously drilled structures, said fastener comprising: a fastener body, extending along a first axis; and an actuating element, projecting from an axial end of the fastener body, the actuating element capable of rotating relative to the fastener body; and an installation tooling as described above, the first opening being configured to receive and rotationally block the axial end of the fastener body, the second opening being configured to receive and rotationally block the actuating member of the fastener.

In addition to other beneficial aspects of the invention, the installation set comprises one or more of the following features, taken individually or according to any technically possible combination:

at least one of the first and second openings of the tool is equipped with a roller cage or anti-rotation shape, capable of rotationally blocking a surface of revolution of the axial end of the fastener body and/or of the actuating element of the fastener;

a radial surface of the fastener body comprises a blocking member, capable of coupling with the at least one projecting blocking element, so as to axially block the fastener body in the first opening.

The invention further relates to a method for the disassembly of a fastener inserted in at least two previously drilled structures, said fastener comprising: a fastener body, extending along a first axis; a plurality of elastic clamps, each comprising a hooking spur in contact with a face of the structures; a blocking member disposed on an outer surface of the body and an actuating element, projecting relative to an axial end of the fastener body, the actuating element capable of rotating relative to the fastener body and capable of displacing the elastic clamps; the method comprising the following steps: introducing the axial end of the fastener body into the first opening of an installation tooling as described above; and introducing the actuating element of the fastener into the second opening of the installation tooling; then introducing pressurized fluid into the pressure chamber, so as to move the plurality of blocking elements into the blocking member of the fastener body, axially blocking the fastener relative to the tool; then rotating the actuating device relative to the tool body, so as to rotate the actuating element relative to the fastener body; then extracting the fastener from the structures.

According to one embodiment, the process then comprises the following steps: stopping the flow of pressurized fluid into the pressure chamber; and introducing pressurized fluid into the ejection chamber, so as to move the ejection piston towards the second opening in order to axially push the fastener out of the tool.

BRIEF DESCRIPTION OF THE DRAWINGS

The invention will become clearer upon reading the following description, which is provided solely as a non-limiting example, and with reference to the drawings, in which.

DETAILED DESCRIPTION

FIGS. 1 to 4 show an installation assembly 10 according to one embodiment of the invention. The assembly 10 comprises a fastener 12 and a tool 14 for the installation or disassembly of said fastener 12.

Figure 1:
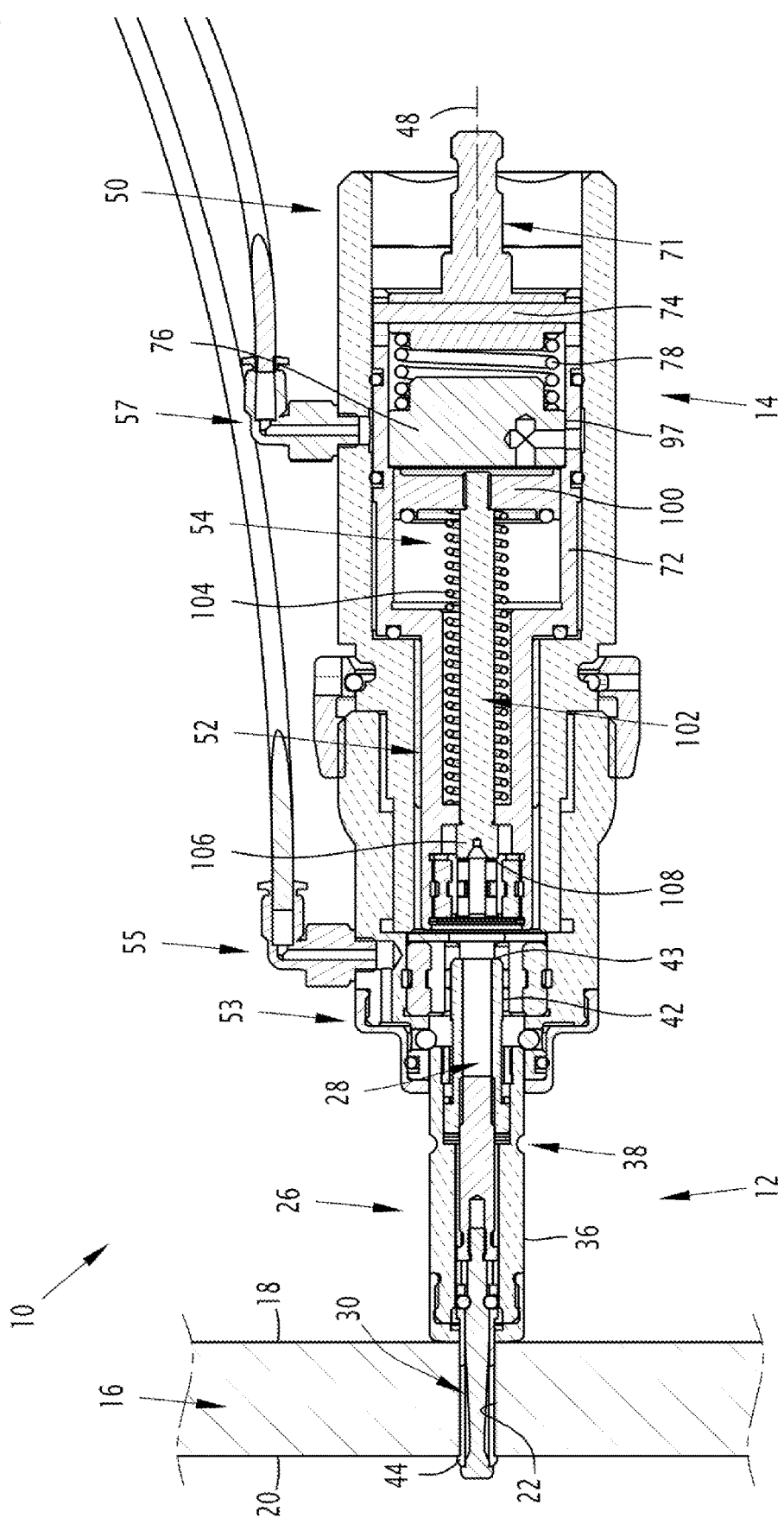
FIGS. 1, 2 and 3 are longitudinal sectional views of an installation set according to one embodiment of the invention, in a first, second and third configuration respectively.

Fastener 12 is designed for the temporary assembly of at least two structures 16, as shown in FIG. 1. For the purpose of simplification, the structures 16 are represented as a single unit, defining two opposing faces 18, 20. A bore 22 passes through the structures 16 from the first face 18 to the second face 20.

The fastener 12 extends along a first axis 24 and comprises a fastener body 26, an actuating element 28, elastic clamps 30, a spacer 32 and a connecting device 34.

The fastener body 26 is tubular in shape and extends along the first axis 24, between a first and a second end. The elastic clamps 30 and the spacer 32 project axially from the first end, referred to as the front end. The actuating element 28 protrudes from the second, referred to as the rear end.

The fastener body 26 has a substantially circular-cylindrical outer surface 36.

In the embodiment shown, the fastener body 26 further comprises a blocking element 38 capable of axially blocking said fastener body 26 relative to the tool 14, as will be described later. In the embodiment shown, the blocking element is an external groove 38, formed in the outer surface 36 around the first axis 24.

The actuating element 28 is rotatable and translatable relative to said fastener body 26. More precisely, an inner surface of the actuating element 28 is fitted with a thread 40 which cooperates with a thread on an outer surface of the connecting device 34.

A rear end of the actuating element 28, projecting from the fastener body 26, has a substantially circular-cylindrical outer surface 42.

The rear end of the actuating element 28 also features a rear annular surface 43, which is substantially flat and perpendicular to the first axis 24.

The elastic clamps 30 extend substantially parallel to the first axis 24 and are positioned substantially evenly around said first axis.

The elastic clamps 30 are designed to pass through the bore 22 of the structures 16. A front end of each elastic clamp 30, opposite the fastener body 26, comprises a hooking spur 44, capable of coming into contact with the second face 20 of the structures 16.

The spacer 32 is positioned along the first axis 24, between the elastic clamps 30. A front end of the spacer 32, opposite the fastener body 26, comprises an enlarged head 46.

In the embodiment shown, the actuating element 28, the elastic clamps 30 and the spacer 32 are axially movable relative to the fastener body 26. In a variant not shown, the elastic clamps 30 are axially movable, and the actuating element 28 and spacer 32 are axially fixed relative to the fastener body 26.

In the embodiment shown, the connecting device 34 extends inside the fastener body 26 and connects the actuating element 28 to the spacer 32, so that translation of the connecting device 34 causes translation of the spacer 32 in the fastener body 26, or of the elastic clamps 30 if the spacer is fixed. The inner surface of the fastener body 26 has a non-cylindrical shape, e.g. hexagonal. The connecting device 34 has a non-cylindrical outer surface, for example, a hexagonal shape, so as to enable translation of the connecting device 34 in the body 26 but block rotation.

FIG. 1 shows the fastener 12 in its installed state. In said installation state, the front end of the fastener body 26 is in contact with the first face 18 of the structures 16 and the elastic clamps 30 are positioned in the bore 22. In addition, the actuating element 28 is in a first position relative to the fastener body 26, and the enlarged head 46 of the spacer 32 is positioned between the hooking spurs 44 of the elastic clamps 30. These elastic clamps are thus in a deployed configuration, with the hooking spurs 44 projecting radially from the bore 22 and coming into contact with the second face 20 of the structures 16.

Figure 2:
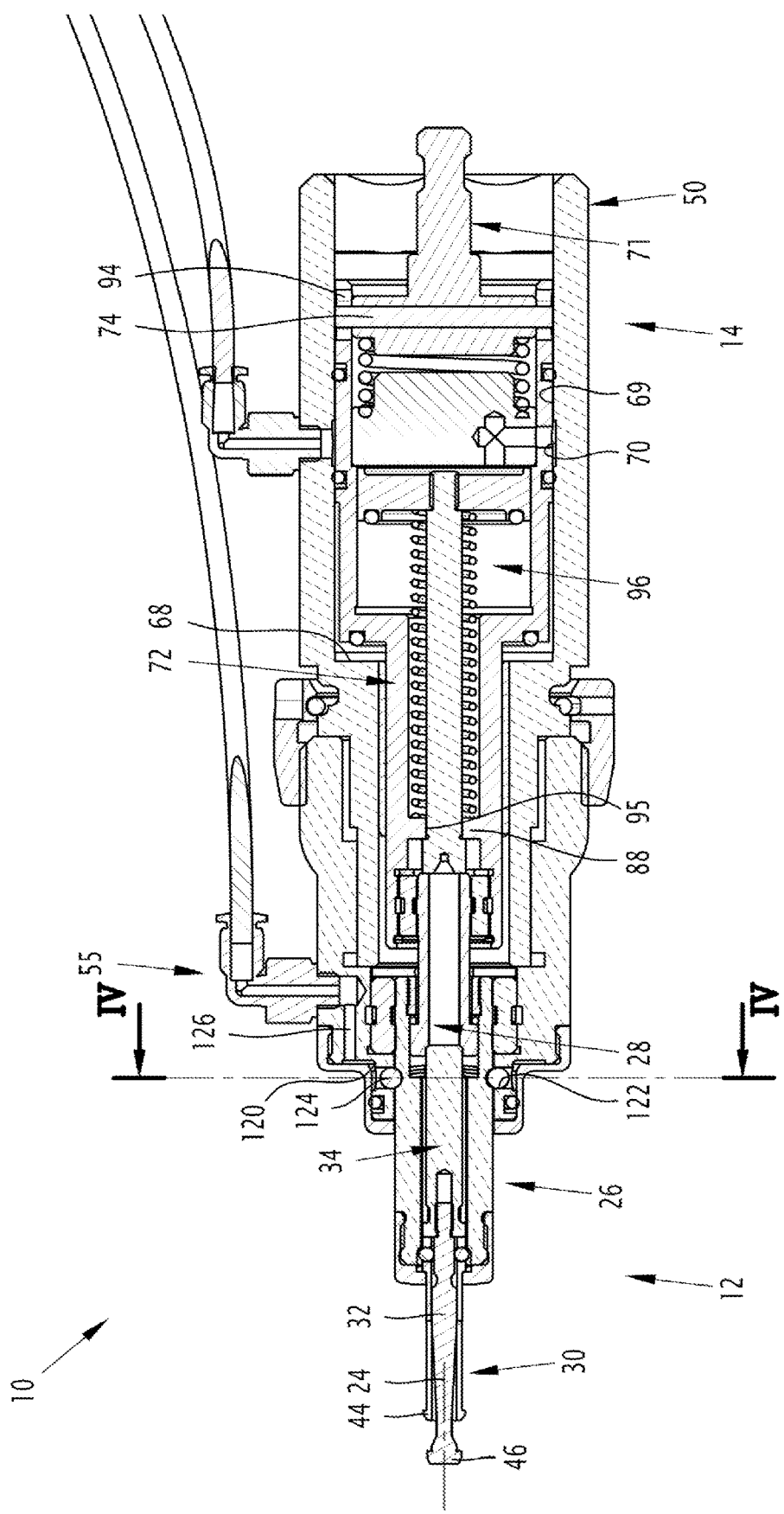
Figure 3:
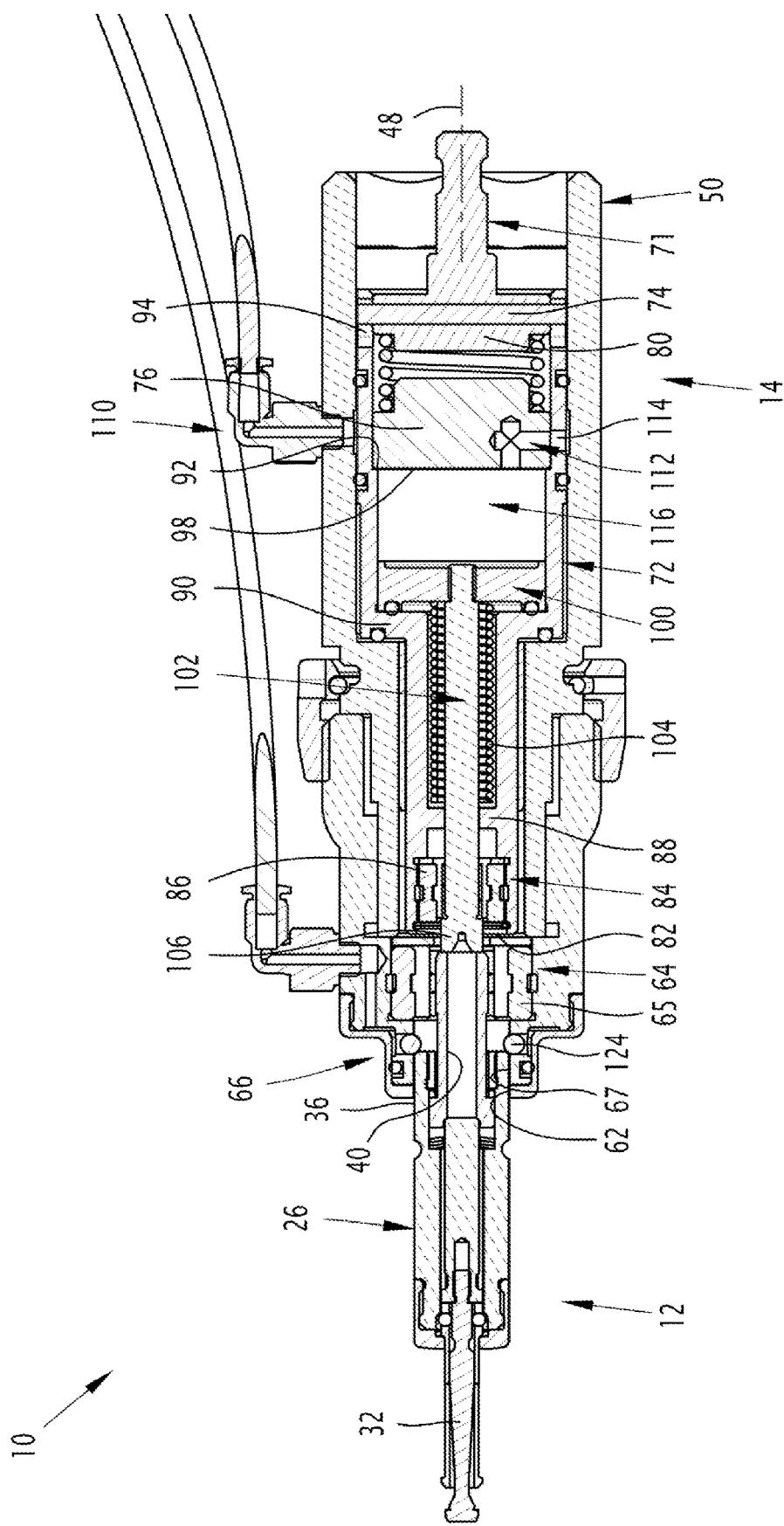

FIGS. 2 and 3 show the fastener 12 in a disassembled state. In said disassembled state, the actuating element 28 is in a second position relative to the fastener body 26. The spacer 32 protrudes axially from the elastic clamps 30, so that the enlarged head 46 is spaced apart from the hooking spurs 44. The elastic clamps 30 are thus in a retracted conformation, with the hooking spurs 44 brought radially closer together. As a result, the elastic clamps 30 are capable of sliding into the bore 22 of the structures 16.

The tool 14, or installation nose, will now be described.

The tool 14 extends along a second axis 48 and comprises: a tool body 50; an actuating device 52; a blocking device 53; an ejection element 54; a first fluid inlet 55; and a second fluid inlet 57.

The tool body 50 is tubular in shape. A first end of the tool body 50, referred to as the front end, comprises a first axial opening 62. The tool body 50 further comprises a first rotation blocking section 64, positioned close to said first axial opening 62.

The first axial opening 62 is capable of receiving the rear end of the body 26 of the fastener 12. The first rotation blocking section 64 is capable of receiving and rotationally blocking said rear end of the body 26.

In the embodiment shown, the first blocking section 64 comprises a first roller cage 65, capable of rotationally blocking the rotational shape of the first radial surface 36, at the rear end of the fastener body 26. The first roller cage is, for example, similar to the device described in EP2999571.

In a variant not shown, the rear end of the fastener body has an anti-rotation shape, comprising, for example, flats or planes, and the first blocking section has a shape complementary to said anti-rotation shape.

In the embodiment shown, the tool body 50 further comprises an axial blocking section 66, positioned between the first axial opening 62 and the first rotation blocking section 64. The axial blocking section 66 is defined in particular by a substantially cylindrical inner wall 67. The axial blocking section 66 will be described in greater detail later.

In the embodiment shown, the tool body 50 further comprises: an internal shoulder 68; an internal radial surface 69; and an internal groove 70.

The internal shoulder 68 is located behind the first rotation blocking section 64 and faces the rear end of the tool body 50. The radial inner surface 69 has a substantially circular-cylindrical shape and extends between the inner shoulder 68 and the rear end of the tool body 50. The internal groove 70 is formed in the radial inner surface 69.

The actuating device 52 comprises: a wrench 71; a wrench body 72; a pin 74; a plug 76; and a first compression spring 78.

The wrench 71 is positioned close to the rear end of the tool body 50. The wrench 71 has a wider front section 80 and a narrower rear section. Said rear section is able to be connected to a motor in order to be rotated about the second axis 48.

The wrench body 72 is tubular in shape. A front end of the wrench body 72 has a second axial opening 82. The wrench body 72 also comprises a second rotation blocking section 84.

The second axial opening 82 is capable of receiving a portion of the rear end of the actuating element 28. The second rotation blocking section 84, adjacent to said second axial opening 82, is capable of receiving and blocking rotation of said rear end portion of the actuating element 28.

In the embodiment shown, the second blocking section 84 comprises a second roller cage 86, capable of rotationally blocking the revolutionary shape of the second radial surface 42. The second roller cage 86 is, for example, similar to the first roller cage 65. In a variant not shown, the rear end portion of the actuating element has an anti-rotation shape, for example comprising flats or planes, and the second blocking section has a shape complementary to said anti-rotation shape.

In the embodiment shown, the wrench body 72 further comprises: an inner crown 88; a first shoulder 90; a second internal shoulder 92; and two oblong holes 94.

The inner crown 88 is close to the second rotation blocking section 84, opposite the second opening 82. The inner crown 88 has a central hole 95, positioned along the second axis 48.

The first 90 and second 92 shoulders are positioned in succession along the second axis 48 from the inner crown 88.

The wrench body 72 has first, second and third increasing internal diameters, respectively between the inner crown 88 and the first shoulder 90, between the first shoulder 90 and the second internal shoulder 92, and behind the second internal shoulder 92.

The two oblong holes 94 are positioned behind the second internal shoulder 92, close to the rear end of the wrench body 72. The pin 74 is positioned transversely to the second axis 48, each end of said pin being positioned in one of said oblong holes 94. The oblong holes 94 have an axial dimension greater than the diameter of the pin section, to allow relative clearance of the pin in the oblong holes 94. The oblong holes 94 can take the form of a groove or any other shape allowing this relative clearance.

In addition, the pin 74 is inserted into a through hole in the front part 80 of the wrench 71. An internal cavity 96 is thus defined in the wrench body 72, between the crown 88 and the wrench 71. The two oblong holes 94 and the pin 74 provide axial clearance between the wrench body 72 and the wrench 71.

The plug 76 is positioned in the internal cavity 96, between the wrench 71 and the second internal shoulder 92 of the wrench body 72.

The plug 76 has a side surface 97 and a front surface 98. The side surface 97 is substantially rotationally cylindrical and has an external diameter slightly greater than the third internal diameter of the wrench body 72, so that the plug 76 is tightly fitted in the wrench body and blocks the diffusion of fluid from the internal cavity to the first spring 78. The front surface is substantially perpendicular to the second axis 48 and oriented towards the first shoulder 90.

The first compression spring 78 is positioned axially between the wrench 71 and the plug 76, opposite the front surface 98. In the configurations shown in FIGS. 1 to 3, the first spring 78 is in a semi-compressed state, so as to push the plug 76 against the second inner shoulder 92 of the wrench body 72.

The actuating device 52 is rotatable inside the body 50 of tool 14. Furthermore, the actuating device 52 is capable of moving in translation inside said tool body 50, along a path limited by the internal shoulder 68 of the tool body, capable of coming into axial abutment against the first shoulder 90 of the wrench body.

The ejector device 54 comprises: a piston 100; an ejector rod 102; and a second compression spring 104.

The piston 100 is positioned in the internal cavity 96 of the wrench body 72, between the first shoulder 90 and the front surface 98 of the plug 76. The piston 100 has an external diameter substantially equal to the second internal diameter of wrench body 72.

The ejector pin 102 extends into the wrench body 72 and passes through the central hole 95 of the inner crown 88. A rear end of rod 102 is integral with the piston 100. A front end of the rod 102 features an ejector head 106, positioned in front of the inner crown 88. The diameter of said ejection head 106 is greater than the diameter of the central hole 95. The ejector head 106 has a front face 108, facing the first opening 62 of the tool body 50. In the embodiment shown, said front face 108 is substantially flat.

The piston 100 and the ejector rod 102 are axially movable inside the wrench body 72, between a first and a second axial position. In the first axial position, shown in FIG. 1, the ejector head 106 is positioned in the second blocking section 84 and abuts axially against the inner crown 88; and the piston 100 abuts against the front surface 98 of the plug 76. In the second axial position, shown in FIG. 3, the piston 100 abuts against the first shoulder 90 of the wrench body 72 and the ejector head 106 projects from the second axial opening 82 of said wrench body.

The second compression spring 104 is positioned in the internal cavity 96 of the wrench body 72, around the ejector rod 102 and between the inner crown 88 and the piston 100.

The second fluid inlet 57 comprises an inlet 110, an intermediate passage 112 and an outlet channel 114. The inlet 110 comprises a hole passing laterally through the tool body 50 and opening onto the internal groove 70 of said tool body. The intermediate passage 112 is a hole passing laterally through the wrench body 72 and opening on the one hand onto the internal groove 70 of the tool body and on the other hand onto the lateral surface 97 of the plug 76. The outlet channel 114 is formed in said plug 76, between the side surface 97 and the front surface 98.

The first compression spring 78 pushes the wrench body 72 relative to the wrench 71, which is translationally fixed relative to the tool 14, in order to compensate for the translation of the actuating element 28 in the clamp body, towards the first end of the body 50, when the actuating element 28 is screwed onto the connecting device 34.

In addition, the internal groove 70 of the tool body 50 has a width along the second axis 48, allowing axial clearance of the wrench body 72 relative to said tool body 50 while maintaining the intermediate passage 112 opposite said internal groove 70. In particular, the width of the internal groove 70 is preferably configured so that said internal groove faces the intermediate passage 112, whatever the axial position of the pin 74 relative to the oblong holes 94.

On either side of the internal groove 70 along the second axis 48, an internal diameter of the tool body 50 is substantially equal to an external diameter of the wrench body 72 on either side of the intermediate passage 112.

The second fluid inlet 57 allows fluid to be introduced from outside the tool 14 into the internal cavity 96, between the plug 76 and the piston 100. As described below, this fluid introduction is capable of axially enlarging the ejection chamber 116, between the plug 76 and the piston 100. The second spring 104 has sufficient stiffness to hold the piston 100 against the plug 76 in the absence of fluid in the ejection chamber 116, as shown in FIG. 2.

The blocking device 53 comprises: a pressure chamber 120; at least one duct 122; and at least one blocking element 124.

The pressure chamber 120 has an annular shape and is positioned in the tool body 50, in the inner wall 67 of the axial blocking section 66.

The at least one duct 122 extends radially between the pressure chamber 120 and the axial blocking section 66.

The at least one blocking element 124 is movable in the at least one duct between a retracted position and a protruding position. In said protruding position, the at least one blocking element 124 protrudes radially inwards into the axial blocking section 66, relative to the inner wall 67.

Preferably, the at least one blocking element 124 is capable of moving in the at least one duct while substantially ensuring a fluid seal between the pressure chamber 120 and the axial blocking section 66.

Figure 4:
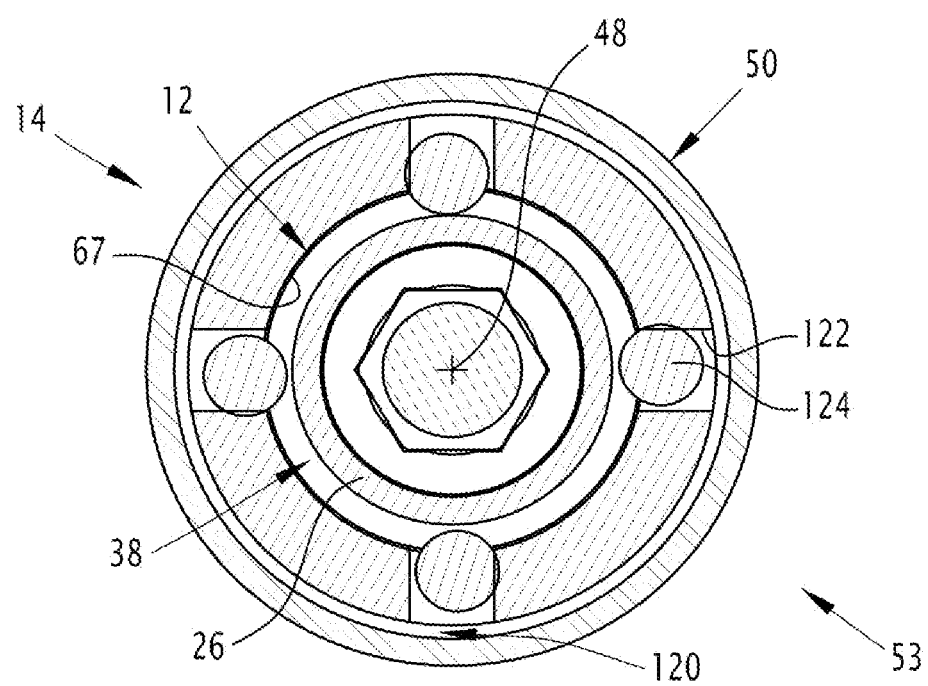
FIG. 4 is a cross-sectional view of the installation set in the second configuration shown in FIG. 2.

In the embodiment shown, as visible in FIG. 4, the blocking device 53 comprises a plurality of ducts 122, angularly positioned around the second axis 48; and the at least one blocking element comprises a plurality of balls 124, each of said balls being housed in one of said ducts and capable of moving between the retracted position and the protruding position.

The first fluid inlet 55 comprises a duct 126 formed between an external surface of the tool body 50 and the pressure chamber 120. In this way, the first fluid inlet 55 allows fluid to be introduced from outside the tool 14 into the pressure chamber 120, so as to move the balls 124 in the ducts 122 towards the protruding position.

In the embodiment shown, the first 55 and second 57 fluid inlets of the tool 14 are connected to pressurized gas supplies, preferably compressed air supplies.

In the first configuration of assembly 10, shown in FIG. 1, the fastener 12 is disassembled from the tool 14 and is about to be assembled to said tool. More precisely, the fastener body 26 and the actuating element 28 are spaced apart from the first 64 and second 84 rotation blocking sections respectively. In FIG. 1, the rear end of the fastener body 26 is positioned at the level of the first axial opening 62 of the tool body 50, with the first 24 and second 48 axes coinciding.

Furthermore, in the first configuration of assembly 10, the first 55 and second 57 fluid inlets are not supplied with compressed air. Under the action of the second compression spring 104, the piston 100 and ejector rod 102 are in the first axial position, behind the wrench body 72. The balls 124 are free to move in the ducts 122 between the protruding position and the retracted position.

Furthermore, in the first configuration, the first shoulder 90 of the wrench body 72 is substantially in contact with the internal shoulder 69 of the tool body 50; and the ends of the pin 74 are in contact with the rear ends of the oblong holes 94.

In the second configuration of assembly 10, visible in FIG. 2 and FIG. 4, the fastener 12 is assembled to tool 14, with the first 24 and second 48 axes coinciding. More precisely, the rear ends of the fastener body 26 and the actuating element 28 are held against rotation by the roller cages 65, 86, respectively of the first 64 and second 84 rotation blocking sections. The external groove 38 of the tool body 26 is axially opposite the ducts 122 of the blocking device 53.

Furthermore, in the second configuration of the assembly 10, the first fluid inlet 55 is supplied with compressed air; and the balls 124 are in a protruding position and housed in the external groove 38 of the fastener body 26.

Furthermore, in the second configuration, the first shoulder 90 of the wrench body 72 is axially spaced from the internal shoulder 69 of the tool body 50; and the ends of the pin 74 are axially spaced from the rear ends of the oblong holes 94.

Furthermore, in the second configuration, the second fluid inlet 57 is not supplied with compressed air and the piston 100 and ejector rod 102 are in the first axial position, behind the wrench body 72. The front face 108 of the ejector head 106 is in contact with the rear surface 43 of the actuating element 28, said actuating element being received in the second blocking section 84.

In the third configuration of the assembly 10, shown in FIG. 3, the fastener 12 is being ejected from the tool 14. The fastener body 26 and the actuating element 28 are axially spaced from the first 64 and second 84 rotation blocking sections respectively.

More precisely, in the third configuration, the second fluid inlet 57 is supplied with compressed air and the piston 100 and ejector rod 102 are in the second axial position, with the piston 100 coming into contact with the first shoulder 90. In addition, the front face 108 of the ejector head 106 is in contact with the rear surface 43 of the actuating element 28.

Furthermore, in the third configuration of the assembly 10, the first fluid inlet 55 is not supplied with compressed air. The balls 124 are free to move in the ducts 122 between the protruding position and the retracted position.

Furthermore, in the third configuration of the assembly 10, the first shoulder 90 of the wrench body 72 is substantially in contact with the internal shoulder 69 of tool body 50; and the ends of the pin 74 are in contact with the rear ends of the oblong holes 94.

A method of operating the assembly 10 will now be described. This process involves the disassembly of the fastener 12, previously assembled to the structures 16.

At the start of the process, the fastener 12 is in the installation state described above. Furthermore, the rear end of the tool body 50 is considered to be connected to an automatic setting machine (not shown), said machine comprising a motor (not shown) connected to the wrench 71.

In the absence of a compressed-air supply to the first 55 and second 57 fluid inlets, the tool 14 is brought close to the fastener 12 and the rear ends of the actuating element 28 and the fastener body 26 are inserted into the first opening 62, so that the first 24 and second 48 axes coincide. The assembly 10 is thus in the first configuration shown in FIG. 1.

The tool 14 continues to move axially forward until the front face 108 of the ejector head 106 comes into contact with the rear surface 43 of the actuating element 28. The rear ends of the fastener body 26 and the actuating element 28 engage the roller cages 65, 86 of the first 64 and second 84 rotation blocking sections. The external groove 38 of the tool body 26 is axially opposite the ducts 122 of the blocking device 53.

The first fluid inlet 55 is then supplied with compressed air. An overpressure of air is thus applied in the pressure chamber 120 and the balls 124 are pushed back into the protruding position. Said balls 124 are thus housed in the external groove 38 of the fastener body 26, axially blocking the fastener 12 relative to the tool 14.

The motor of the robot is then activated to rotate the wrench 71 in a first direction of rotation. The actuating element 28 is thus rotated by the second roller cage 86 of the wrench body 72, while the fastener body 26 is held stationary by the first roller cage 65.

By means of the connecting device 34, the rotation of the actuating element 28 relative to the fastener body 32 brings the fastener 12 from the installation state, in which the enlarged head 46 of the spacer 32 is positioned between the hooking spurs 44 of the elastic clamps 30, to the disassembly state, in which the said hooking spurs 44 are brought closer together. At this stage of the process, the assembly 10 is in the second configuration shown in FIGS. 2 and 4.

In the embodiment shown, the transition of the fastener 12 from the installation state to the disassembly state results in a helical rearward displacement of the actuating element 28 relative to the fastener body 26. As the wrench 71 rotates, the wrench body 72 is pushed back from the tool body 50 by the ejector head 106, sandwiched between the actuating element 28 and the inner crown 88. The first shoulder 90 of the wrench body 72 is therefore at a distance from the internal shoulder 69 of the tool body 50. With the wrench 71 translationally fixed relative to the tool body 50, the ends of the pin 74 move away from the rear ends of the oblong holes 94 and the first spring 78 compresses slightly.

According to a variant of the invention, in which the actuating element 28 for the fastener 12 is fixed in translation relative to the fastener body 26, the rotation of the wrench 71 does not cause the wrench body 72 to move backwards relative to the tool body 50.

With the fastener 12 in the disassembled state, the rotation of the motor of the robot is shut off, the compressed air supply to the first fluid inlet 55 is maintained and the robot (not shown) is moved, enabling the elastic clamps 30 to be extracted from the bore 22 of the structures. The fastener 12, for example, is transported by the robot to a collection container (not shown).

The compressed air supply to the first fluid inlet 55 is then shut off. Then, or simultaneously, the second fluid inlet 57 is supplied with compressed air, leading to the expansion of the ejection chamber 116 between the plug 76 and the piston 100. The air pressure compensates for the action of the second spring 104, and the piston 100 and ejector rod 102 are pushed forward to the second axial position, in which the piston 100 contacts the first shoulder 90 of the wrench body. At the same time, the first spring 78 is released and the first shoulder 90 comes into contact with the internal shoulder 69 of the tool body 50.

The front face 108 of the ejector head 106 thus pushes forward the rear surface 43 of the actuating element 28.

At this stage of the process, the assembly 10 is in the third configuration shown in FIG. 3. The stroke of the piston 100 is calculated to eject the fastener from the installation nose. As the fastener body 26 is no longer held axially by the balls 124, the fastener 12 is pushed forward out of the installation nose.

The compressed air supply to the second fluid inlet 57 is then shut off. The second spring 104 relaxes and the piston 100 and the ejector rod 102 move backwards to the first axial position.

A reverse procedure enables the fastener 12 to be installed and connected to the structures 16. During the installation process, the motor of the robot is switched on in a second direction of rotation, opposite to the first.

The invention claimed is:

1. An installation tooling for assembling a fastener to at least two pre-drilled structures, the fastener including a fastener body extending along a first axis and an actuating element projecting from an axial end of the fastener body, the actuating element being rotatable relative to the fastener body, the installation tooling comprising:

a tubular tool body extending along a second axis and including an axial end with a first opening, the first opening being configured to receive the axial end of the fastener body and to block rotation of the axial end of the fastener body;

an actuating device received inside the tubular tool body, rotatable relative to the tubular tool body and defining an internal cavity and an axial end with a second opening, the second opening being configured to open into the internal cavity, to receive the actuating element of the fastener and to prevent rotation of the actuating element of the fastener;

an annular pressure chamber formed in the tubular tool body around the first opening;

at least one duct, positioned radially relative to the second axis, connecting the annular pressure chamber to the first opening;

at least one blocking element that is movable in the at least one duct between a retracted position and a projecting position where the at least one blocking element projects into the first opening; and a first fluid inlet opening into the annular pressure chamber;

wherein the installation tooling is configured so that a fluid inlet into the annular pressure chamber is able to move the at least one blocking element towards the protruding position.

2. An installation tooling according to claim 1, wherein the actuating device comprises a wrench, configured to be driven in rotation by a motor, and a wrench body that includes the cavity and the second opening; and an axial clearance is provided between the wrench and the wrench body.

3. An installation tooling according to claim 1, wherein at least one of the first and second openings is equipped with a roller cage or anti-rotation shape that is configured to rotationally block an external surface of the fastener body and/or the actuating element of the fastener.

4. An installation tooling according to claim 1, wherein the at least one duct comprises a plurality of ducts angularly distributed around the second axis; and the at least one blocking element comprises a plurality of blocking elements, each of the blocking elements being movable in respective ones of the ducts between the retracted position and the projecting position.

5. An installation tooling according to claim 4, wherein the blocking elements comprise balls.

6. An installation tooling according to claim 1, further comprising:
an ejector piston, axially movable in the internal cavity, so as to define an ejection chamber inside the internal cavity; and
a second fluid inlet, opening into the ejection chamber;
wherein the installation tooling is configured so that a fluid overpressure in the ejection chamber is able to move the ejector piston towards the second opening.

7. An installation tooling according to claim 6, further comprising:
an ejector rod extending along the second axis in the internal cavity of the actuating device, a first end of the ejector rod being attached to the ejector piston, a second end of the ejector rod being oriented towards the first opening of the tubular tool body.

8. An installation tooling according to claim 7, further comprising:
a compression spring positioned in the internal cavity around the ejector rod, between an inner crown of the actuating device, positioned close to the second opening, and the piston.

9. An installation set, comprising:
a fastener, for temporary assembly of at least two previously drilled structures, including a fastener body that extends along a first axis and an actuation element that projects from an axial end of the fastener and is rotatably movable with respect to the fastener body; and
an installation tooling according to claim 1.

10. An installation set according to claim 9, wherein the fastener body comprises a fastener body blocking element configured to couple with the at least one blocking element of the installation tooling in the projecting position, so as to axially lock the fastener body in the first opening of the tubular tool body.

* * * * *